United States Patent Office 3,423,419
Patented Jan. 21, 1969

3,423,419
N-FLUORO-N-NITROAMINE COMPOUNDS AND METHOD OF PREPARATION
Vytautas Grakauskas, Arcadia, and Kurt Baum, Los Angeles, Calif., assignors to Aerojet-General Corporation, Azusa, Calif., a corporation of Ohio
No Drawing. Filed July 9, 1962, Ser. No. 208,981
U.S. Cl. 260—308     17 Claims
Int. Cl. C07d 55/56, 111/00

This invention relates to novel N-fluoro-N-nitroamines and to their method of preparation.

It is an object of this invention to react organic compounds containing at least one terminal N-nitroamine group with fluorine. It is another object of this invention to prepare novel compounds containing one or more terminal groups of the formula $$\begin{matrix} \text{NO}_2 \\ | \\ -\text{N}-\text{F} \end{matrix}$$

It is another object of this invention to prepare these compounds in a novel manner in good yield and without extensive contamination. It is still another object of this invention to prepare new compounds containing one or more nitro groups and a nitrogenfluorine bond, which are especially useful as explosives and as high energy components for rocket fuels. These and other objects of this invention will be apparent from the detailed description which follows.

The novel process of this invention involves the fluorination of organic compounds containing at least one terminal N-nitroamine grouping of the formula

wherein M is hydrogen or any metal cation. The free valence of the above group may be satisfied by essentially any organic radical. The exact nature of the organic portion of the molecule is not critical since the fluorination reaction occurs at the site of the hydrogen or metal cation, to form the high energy grouping $$\begin{matrix} \text{NO}_2 \\ | \\ -\text{N}-\text{F} \end{matrix}$$

with hydrogen fluoride or metal fluoride salts being produced as by-products. It is to be understood that the organic compound which is fluorinated may contain several of these terminal N-nitroamine groupings.

Likewise, in the case of polyvalent metals, several of the $$\begin{matrix} \text{NO}_2 \\ | \\ -\text{N}- \end{matrix}$$

portions of the terminal group may be attached to a single metal cation. Thus, for example, when calcium is the cation, the terminal group of the compound to be fluorinated has the formula

Fluorination of such a group yields two $$\begin{matrix} \text{NO}_2 \\ | \\ -\text{N}-\text{F} \end{matrix}$$

groups.

The reaction between fluorine and organic compounds having at least one of the above-described terminal groups, i.e., a primary organic N-nitroamine or salt thereof, proceeds in accordance with the following general reaction equation:

(I) 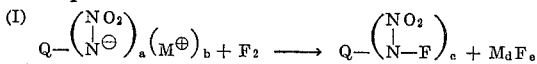

wherein Q is an monovalent or polyvalent organic radical, M is a metal cation or hydrogen, and a, b, c, d and e are small whole numbers of from 1 to about 5. Illustrative of the metal cations suitable for use in the above reaction are the metals in Groups I–A and II–A of Period 2, Groups I–A, II–A and III–A of Period 3; Groups I–A, II–A, III–A, IV–A, I–B, II–B, III–B, IV–B, V–B, VI–B and VII–B of Period 4; Groups I–A, II–A, III–A, IV–A, V–A, I–B, II–B, III–B, IV–B, V–B, VI–B and VII–B of Period 5; Groups I–A, II–A, III–A, IV–A, V–A, VI–A, I–B, II–B, III–B, IV–B, V–B, VI–B and VII–B of Period 6; and all of the elements of Group VIII of the Periodic Table as it appears in the Handbook of Chemistry and Physics, 42nd edition, pages 448 and 449. Specific examples of such metals are sodium, potassium, beryllium, magnesium, calcium, barium, titanium, zirconium, tin, lead, vanadium, antimony, bismuth, chromium, molybdenum, tungsten, manganese, iron, cobalt, nickel, platinum, copper, silver, gold, mercury, cadmium, zinc, aluminum, etc.

Preferred metals are those in Periods 2–4, i.e., those elements having atomic members 3, 4, 11–13 and 9–32. More preferably, M is an alkali metal cation such as lithium, sodium or potassium.

In general, the metal cation is introduced into the reactant

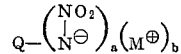

by treating the corresponding primary N-nitroamine

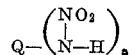

with the hydroxide of the metal cation M. For example, the sodium ion is introduced by treating the corresponding primary N-nitroamine with sodium hydroxide. Similarly, the calcium, aluminum, potassium and magnesium salts are obtained from the free N-nitroamine by reaction with calcium hydroxide, aluminum hydroxide, potassium hydroxide and magnesium hydroxide, respectively.

As has been indicated above, Q in the above reaction equation can be any monovalent or polyvalent organic radical.

For example, compounds of the formula

wherein R is a substituted or unsubstituted hydrocarbyl or monovalent heterocyclic radical, preferably having from 1 to about 20 atoms; may be prepared from the corresponding N-nitroamines or metal salt thereof in accordance with this invention. Typical of suitable hydrocarbyl radicals are alkyl radicals, alkenyl radicals, aryl radicals, cycloalkyl radicals, alkaryl radicals and aralkyl radicals. Typical of suitable alkyl radicals are those having from 1 to about 20 carbon atoms, such as methyl, ethyl, propyl, dodecyl, eicosyl, etc. Preferred cycloalkyl radicals are cyclohexyl and cyclopentyl radicals. Aryl radicals are illustrated by phenyl, naphthyl, anthracyl, etc. Illustrative aryl radicals are those having from 1 to about 12 carbon atoms. Typical aralkyl and alkaryl radicals are benzyl and tolyl. In general, the lower hydrocarbyl radicals are preferred, i.e., those having less than 10 carbon atoms since such compounds have a higher percentage of the energetic $NO_2$ and N–F groups, thus rendering them more effective as explosives.

Suitable monovalent hetercyclic radicals are, for example, pyridyl, furyl, tetrazolyl, tetrazinyl, benzothiofuryl, thienyl, pyryl, etc. Preferred monovalent heterocyclic radicals are those containing 5 and 6 atoms in the ring, 1 to 4 of which are nitrogen atoms with the balance of the ring being carbon atoms. It should be understood that any of the above-mentioned monovalent organic radicals may carry from 1 up to about 5 substituent groups such as nitro, hydroxy, halogen, sulpho, carboxy, etc.

These substituted radicals include nitroalkyl, nitroaryl, haloalkyl, haloaryl, hydroxy alkyl, carboxy alkyl, etc. Typical of specific substituent-carrying radicals are the nitroethyl, methylol, ethylol, pentachlorophenyl, hydroxy phenyl, trifluoropropyl, 2-sulfoethyl, nitropyridyl, ω-carboxypropyl, and 2,5-dichlorocyclohexyl groups.

As is obvious from the foregoing, when R is a substituted or unsubstituted, hydrocarbyl or heterocyclic radical in the above formula, compounds such as N-fluoro-N-nitro methylamine; N-fluoro-N-nitro-2-sulfoethylamine; N-fluoro-N-nitro isopropylamine; N-fluoro-N-nitro ethanolamine; N-fluoro-N-nitro-2,2,4,4,-tetranitro pentylamine; N-fluoro-N-nitro decylamine; N-fluoro-N-nitro phenylamine; N-fluoro-N-nitro- pentachlorophenylamine; N-fluoro-N-nitro glycine; N-fluoro-N-nitro cyclohexylamine; N-fluoro-N-nitro cyclopentylamine; N-fluoro-N-nitro propenylamine; N-fluoro-N-nitro dodecenylamine; N-fluoro-N-nitro anthracylamine; N-fluoro-N-nitro biphenylylamine; N-fluoro-N-nitro paradichloroaniline; N-fluoro-N-nitro tolylamine; N-fluoro-N-nitro benzylamine; 5-(fluoronitroamino) tetrazole; 2-(fluoronitroamine) pyridine; 2-(fluoronitroamino)-3,3-dibromo-piperazine; 2-(fluoronitroamino)-4-methyl-quinoline; N-fluoro-N-nitro chloromethylamine; and 2-(fluoronitroamino) furan are obtainable.

In addition to those above-mentioned, other compounds prepared according to this invention include those containing monovalent radicals which are interrupted by hetero-atoms such as sulfur, oxygen and nitrogen. These hetero-interrupted compounds have the formula

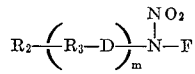

wherein $R_2$ is hydrocarbyl such as alkyl or aryl, $R_3$ is nitrogen,

nitro-substituted nitrogen (nitraza), oxygen or sulfur, D is alkylene or arylene, and $m$ is a small whole number of from 1 to about 5. Preferably $R_2$ and D contain from 1 to about 10 carbon atoms. The groups $R_2$ and D may carry up to about 5 substituents' such as nitro or halo, i.e., $R_2$ and D may be nitroalkylene, haloalkylene, haloarylene, nitroarylene, etc.

The following is a compound containing a hetero oxygen atom

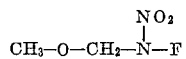

Typical of the compounds containing the hetero sulfur atom is the compound of the formula

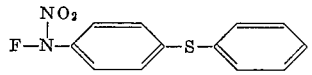

The following typifies a compound containing a hetero nitrogen atom

Other compounds containing the above-mentioned hetero-interrupted groups include N-fluoro-N-nitro-2-methoxy-ethylamine; N-fluoro-N-nitro - 3 - thio-pentylamine; N-fluoro-N-nitro-3-nitraza pentylamine; N-fluoro-N-nitro-3-aza-hexylamine; and the like.

In addition to those monovalent groups already mentioned there may be attached to the

groups of the compounds of this invention, monovalent radicals containing linkages such as

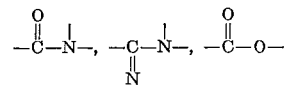

and the like.

Thus, this invention encompasses compounds of the formula

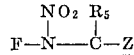

wherein $R_5$ is oxygen, sulfur or NH; and Z is selected from the group consisting of —$NH_2$ and —O—$R_4$, wherein $R_4$ is a monovalent organic radical, and preferably a hydrocarbyl radical such as alkyl or aryl. These groups may also carry substituents such as nitro, halo and hydroxy. Compounds produced by the process of this invention and containing the group of the formula

include N-fluoro-N-nitrourea; N-fluoro-N-nitrothiourea; N-fluoro-N-nitro guanidine; N-fluoro-N-nitro-ethylcarbamate; N-fluoro-N-nitro phenylcarbamate and the like.

When Q is divalent organic radical in Reaction I, illustrative and preferred compounds prepared according to said reaction have the formulae

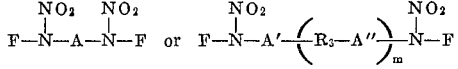

wherein A, A' and A'' may be, for example, alkylene and arylene, $R_3$ is nitrogen, nitraza, sulfur or oxygen; and $m$ is a small whole number of 1 to about 5. The groups A, A' and A'' may carry substituents such as halogen, nitro, sulfo, hydroxy and carboxy groups. Preferably the groups A, A' and A'' are lower alkylene, arylene, nitroalkylene, nitroarylene, haloalkylene and haloarylene; and contain from 1 to about 10 carbon atoms.

Illustrative of compounds produced in accordance with Reaction I wherein Q is divalent are: N,N'-difluoro-N,N'-dinitro-methylenediamine; N,N'-difluoro-N,N'-dinitro-ethylene- diamine; N,N'-difluoro-N,N'-dinitrodecamethylenediamine; N,N'-difluoro-N,N'-dinitro paraphenylene diamine; N,N'-difluoro-N,N'-dinitro naphthylene diamine; 1,7-difluoro-1,4,8-trinitraza heptane; 1,5-difluoro-1,5-dinitro-3-thio-pentanediamine; and N,N'-difluoro-N,N'-dinitro-3,3-dichloro-1,5 pentane diamine.

In summary, the Q radical in the products obtained by carrying out Reaction I, above, preferably are mono- or divalent organic radicals, the most desirable monovalent organic radicals being selected from the grouping consisting of

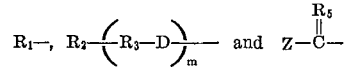

and the most desirable divalent organic radicals being selected from the group consisting of —A— and —A'—(—$R_3$—A''—)—$_m$ wherein $R_1$, $R_2$, $R_3$, D, $R_5$, Z, A, A', A'' and $m$ are as previously defined.

The aforementioned reactions of this invention are carried out in a substantially inert moderator. The term "substantially inert" as used throughout the specification and claims is intended to include any moderator which is less reactive with fluorine than the primary organic nitroamine being fluorinated.

The most suitable substantially inert moderators are those less than one quarter as reactive with fluorine as the N-nitroamines. The moderator of this invention is any polar or non-polar material in which the N-nitroamine being fluorinated is at least partially soluble. Thus the moderator may be a complete solvent for the material being fluorinated. Likewise, the moderator may be a material in which the N-nitroamine forms only a partial suspension. Preferably, although not necessarily, the N-nitroamine is soluble in the moderator at least to the extent of 1 part by weight per 100 parts of the moderator. Use of the moderator is an essential part of the fluorination reaction. The moderator serves not only as a carrier for the reaction but is also essential to the controlled fluorination of the N-nitroamine.

We are not certain as to the exact mechanism by which the moderators control the fluorination. However, the moderator is known to serve as more than a carrier for the the reaction since omission of the moderator results in rapid random fluorination of the N-nitroamine to the extent of decomposition and contamination of the ultimate product. Further, the moderator promotes selective fluorination, i.e., the fluorination will occur only in the most reactive site in the N-nitroamine.

The specific moderator chosen is not critical and its selection depends upon such factors as cost, availability, inertness and solvent characteristics.

The preferred moderators are those polar and nonpolar materials which are liquid within a temperature range of about −40° C. to about +40° C. This does not mean that our moderator must be liquid throughout this entire range. Rather, our preferred moderators are liquid over at least some portion of this range, that is, they have a normal melting point either below or within this range. Typical of the suitable moderators for use in the practice of this invention are the hydrocarbon alkanes and especially the hydrocarbon alkanes having from 5 to about 10 carbon atoms, such as pentane, hexane, octane, nonane and decane. Another group of suitable moderators are the haloalkanes having from 1 to about 8 carbon atoms, such as methylene dichloride, ethylene chloride, chloroform and carbon tetrachloride. Still another class of moderators are the aromatic hydrocarbons having from 6 to about 12 carbon atoms, such as benzene, toluene and the ortho, meta and para isomers of xylene. The chlorinated aromatic hydrocarbons containing 6 to 12 carbon atoms may also be used. Illustrative of these are monochlorobenzene and chlorotoluene.

Other suitable moderators include the aliphatic ketones, having the formula

and ethers having the formula

R—O—R and the dialkyl substituted amides having the formula

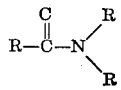

wherein the above formula the R groups are alkyl, and preferably lower alkyl having from 1 to about 10 carbon atoms, such as methyl, ethyl, pentyl and octyl. Specific ketones includes dimethyl ketone, diethyl ketone and methyl, ethyl ketone. The ethers include dimethyl ether, diethyl ether and diisopropyl ether. The substituted amides include dimethyl formamide, diethyl formamide and dimethyl acetamie.

Still other moderators are water, the lower alkanols having from 1 to about 10 carbon atoms and the lower alkylene glycols having from 1 to about 10 carbon atoms. Suitable lower alkanols and alkylene glycols include methanol, ethanol, isopropanol, ethylene glycol, propylene glycol and butylene glycol.

Preferred among the foregoing moderators are the polar solvents such as water, the lower alkanols and the lower alkylene glycols.

It is to be understood that mixtures of any of the foregoing moderators may be employed in the practice of this invention. Water is the preferred moderator because of its low cost and ready availability. However, lower aliphatic alcohols such as methanol, ethanol, and isopropanol have been found to give very good results. It is surprising that the fluorination reaction can be carried out in lower aliphatic alcohols since the introduction of fluorine into the lower aliphatic alcohol would normally be expected to cause fires and explosions. Fluorination reactions of this invention were found to proceed very satisfactorily in the lower aliphatic alcohols.

The amount of the moderator employed is not critical. Normally the weight ratio of moderator to the N-nitroamine being fluorinated is within the ratio from about 0.5 to about 200, and more preferably within the range from about 1.0 to about 20.

The temperature at which these fluorination reactions are carried out is not critical. Normally it is desirable to keep the temperature as low as possible when working with fluorine, and thus the preferred reaction temperature is between about −40° C. and about +40° C. More preferably the reatcion is carried out between the temperature of about −5° C. and +5° C.

The fluorine gas used in this invention can sometimes be diluted with an inert gas such as helium or nitrogen so as to improve the control of the rate of fluorine addition.

The fluorinations of this invention may be carried out in any conventional reactor. However, for long reactor life, those portions of the reactor which come in contact with fluorine should be coated with material such as nickel or polyethylene.

In the fluorinations of this invention the proportions of the reactants are not critical. Normally the organic primary N-nitroamine and fluorine should be used in approximately stoichiometrically equivalent amounts since the use of excessive fluorine may cause extensive reaction with the moderator resulting in undesirable contamination of the desired product.

The novel N-fluoro-N-nitroamines of this invention may be isolated in conventional manner, i.e., by filtration, crystallization, extraction and/or distillation.

Fuorination reactions in this invention may be carried out under any suitable pressure. Normally atmospheric pressure is used since it is most convenient. However, it may be sometimes desirable to conduct the fluorination under elevated pressure in order to increase the solubility of the fluorine in the moderator.

The examples which follow are presented only for purposes of illustration and should not be regarded as limitative of the scope of our invention in any way. In the examples, percentages are by weight and gas volumes are at standard temperature and pressure unless otherwise indicated.

EXAMPLE I

Preparation of N-fluoro-N-nitro-butylamine

A stream of fluorine (2–3 liters) diluted with helium (10 liters) was passed at 5–7° C. with stirring into a solution of 0.1 mole of the potassium salt of n-butyl-nitroamine (prepared by the neutralization of 0.1 mole of n-butylnitroamine with 0.1 mole of potassium hydroxide) in 200 ml. distilled water. The reaction was continued for a period of 60–70 minutes and during this time 3–4 liters of fluorine gas were consumed. A pale yellow oil began to separate from the clear reaction mixture at the beginning of fluorination and the amount of the material gradually increased. At the end of the reaction the reaction mixture was transferred into a separatory funnel and the organic material was separated from the aqueous solution. The product was washed with two 70 ml. portions of saturated aqueous sodium bicarbonate and then several times with water. The material was dried over anhydrous sodium sulfate, filtered, and the clear colorless filtrate was distilled at reduced pressure to yield 10 g. of a clear liquid having an index of refraction of 1.404. Elemental analysis of the product showed it to be N-fluoro-N-nitro butylamine.

When the above example is repeated at +35° C., using

N-nitropropenylamine in lieu of N-nitro butylamine and benzene as the moderator, N-fluoro-N-nitro propenylamine is obtained.

EXAMPLE II

Preparation of N-fluoro-N-nitro phenylamine

The potassium salt of N-nitroaniline is fluorinated under the conditions described in Example I, using diethyl ether as the moderator. The product, which is obtained in good yield, is found to be N-fluoro-N-nitro phenylamine.

When the above reaction is repeated using the ferric and aluminum salts of N-nitroaniline instead of the potassium salt, N-fluoro-N-nitro phenylamine is again obtained in good yield.

EXAMPLE III

Preparation of 5-(fluoronitroamino) tetrazole

The sodium salt of 5-(nitroamino) tetrazole is fluorinated under the conditions described in Example I, using dimethyl formamide as the moderator. The product is isolated and found to be 5-(fluoronitroamino) tetrazole.

EXAMPLE IV

Preparation of N,N'-difluoro-N,N'-dinitroethylenediamine

The sodium salt of ethylenedinitramine was fluorinated under the same reaction conditions as described in Example I. The clear reaction mixture became cloudy during the initial stages of reaction and more and more oily material accumulated on the bottom of the reaction flask. The reaction product was extracted with methylene chloride. The methylene chloride solution was dried over anhydrous sodium sulfate and filtered to isolate the product. Infrared spectrum of the reaction product showed the material to be N,N-difluoro-N,N'-dinitroethylenediamine.

When the foregoing example is repeated using the barium rather than the sodium salt of ethylenedinitramine, satisfactory results are obtained.

EXAMPLE V

Preparation of N-fluoro-N-nitrourea

N-fluoro-N-nitrourea is prepared by the fluorination of N-nitrourea under the conditions described in Example I, using propanol as the moderator. The product which is isolated represents a good yield.

When this example is repeated using ethylene glycol as the moderator, a good yield is obtained.

When this example is repeated using N-nitroguanidine in lieu of N-nitrourea, N-fluoro-N-nitroguanidine is isolated.

EXAMPLE VI

Preparation of N-fluoro-N-nitro cyclohexylamine

The potassium salt of N-nitro cyclohexylamine is fluorinated under the conditions described in Example I, using hexane as the moderator. Analysis of the product shows it to be N-fluoro-N-nitrocyclohexylamine.

When the foregoing example is repeated, substituting the ferric salt of N-nitro-cylopentylamine for the potassium salt of N-nitro-cyclohexylamine, a good yield of N-fluoro-N-nitrocyclopentylamine is obtained.

EXAMPLE VII

Preparation of N-fluoro-N-nitro glycine

Fluorination of N-nitro glycine is carried out under the conditions described in Example I. N-fluoro-N-nitro glycine is obtained in good yield.

Repetition of this example employing N-nitro-ethylcarbamate in lieu of N-nitro glycine, yields N-fluoro-N-nitro ethylcarbamate in good yield.

EXAMPLE VIII

Preparation of 1,7-difluoro-1,4,7-trinitraza heptane

The sodium salt of 1,4,7-trinitraza heptane is obtained by neutralizing 1,4,7-trinitraza heptane with sodium hydroxide. Fluorination of this salt in accordance with the procedures set forth in Example I, using chlorobenzene as the moderator, yields 1,7-difluoro-1,4,7-trinitraza heptane.

When the lead salt of N,N'-dinitro-3,3-dinitro-pentane diamine is substituted for the salt of 1,4,7-trinitraza heptane in the foregoing example, N,N'-difluoro-N,N'-dinitro-3,3-dinitro-1,5-pentane diamine is obtained.

The novel N-fluoro-N-nitroamines of this invention contain a plurality of energetic N-F bonds and are thus inherently useful as explosives. In addition the novel compounds of this invention find application as high energy components in rocket fuel formulations. Thus, the lower molecular weight compounds prepared in accordance with this invention are useful as the oxidizer in liquid fuel rocket engine. For instance, such compounds can be used in lieu of nitric acid or nitrogen tetroxide to oxidize hydrazine or unsymmetrical dimethyl hydrazine fuels. Likewise, these compounds can be used in place of liquid oxygen to oxidize the kerosene fuels commonly used in rocket engines.

The higher molecular weight compounds of this invention are also suitable as placticizers for nitrocellulose and nitropolymers such as the nitro-substituted polyurethanes disclosed in assignee's copending U.S. patent application, Ser. No. 728,491, filed Apr. 14, 1958 and now abandoned. The novel compounds of this invention are also useful intermediates in the preparation of many other organic compounds.

It will be understood that various modifications may be made in this invention without departing from the spirit thereof or the scope of the appended claims.

We claim:

1. Compounds of the formula

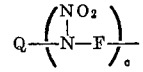

wherein Q is selected from the group consisting of monovalent and divalent organic radicals and $c$ is a whole number from 1 to 2, with the proviso that when $c$ is 1, Q is a monovalent radical having from 1 to 20 atoms and selected from the group consisting of alkyl, cycloalkyl, aryl, alkaryl and aralkyl 5-tetrazolyl radicals, radicals having the formula

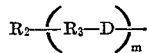

and radicals having the formula

and when $c$ is 2, Q is a divalent radical selected from the group consisting of —A— and

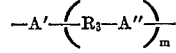

wherein in the foregoing formulae $R_2$ is a radical having from 1 to 10 carbon atoms and selected from the group consisting of alkyl and aryl radicals, Z is selected from the group consisting of —$NH_2$ and —O—$R_4$ wherein $R_4$ is selected from the group consisting of alkyl and aryl radicals having from 1 to 10 carbon atoms, D, A, A' and A'' are alkylene radicals, $R_3$ is selected from the group consisting of —NH—, nitraza, oxygen and sulfur, $R_5$ is selected from the group consisting of oxygen, sulfur and NH, and $m$ is a small whole number of from 1 to 5.

2. Compounds of the formula

wherein $R_1$ is a radical containing from 1 to 20 atoms and selected from the group consisting of alkyl, cycloalkyl, aryl, alkaryl, aralkyl and 5-tetrazolyl.

3. Compounds of the formula

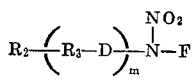

wherein $R_2$ is a radical having from 1 to 10 carbon atoms and selected from the group consisting of alkyl and aryl radicals, $R_3$ is selected from the group consisting of NH, nitraza, oxygen, and sulfur, D is an alkylene radical having 1 to 10 carbon atoms, and $m$ is a small whole number of from 1 to about 5.

4. Compounds of the formula

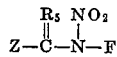

wherein $R_5$ is selected from the group consisting of oxygen, sulfur and NH, and Z is selected from the group consisting of $NH_2$ and $O$—$R_4$, wherein $R_4$ is selected from the group consisting of alkyl and aryl radicals having from 1 to 10 carbon atoms.

5. Compounds of the formula

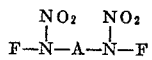

wherein A is an alkylene radical having from 1 to 10 carbon atoms.

6. Compounds of the formula

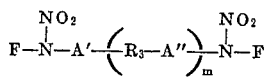

wherein A' and A'' are alkylene radicals having from 1 to 10 carbon atoms, $R_3$ is selected from the group consisting of NH, nitraza, oxygen and sulfur, and $m$ is a small whole number of from 1 to about 5.

7. The compound of N-fluoro-N-nitro butylamine.
8. The compound of N-fluoro-N-nitro phenylamine.
9. The compound 5-(fluoronitramino) tetrazole.
10. The compound N,N'-difluoro-N,N'-dinitroethylenediamine.
11. The method of preparing novel organic compounds of the formula:

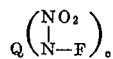

which comprises reacting fluorine in the presence of a substantially inert moderator with a compound of the formula:

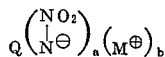

wherein M is selected from the group consisting of hydrogen and an alkali metal ion; $a$, $b$ and $c$ are small whole numbers from 1 to 2; and wherein Q is selected from a group consisting of monovalent and divalent organic radicals with the proviso that when $c$ is 1, Q is a monovalent radical having from 1 to 20 atoms selected from the group consisting of alkyl, cycloalkyl, aryl, alkaryl, aralkyl, 5-tetrazolyl radicals having the formula:

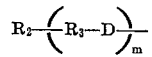

and radicals having the formula:

and when $c$ is 2, Q is a divalent radical selected from the group consisting of:

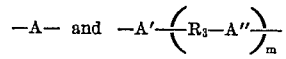

wherein in the foregoing formulae $R_2$ is a radical having from 1 to 10 carbon atoms and selected from the group consisting of alkyl and aryl radicals; Z is selected from the group consisting of —$NH_2$ and —O—$R_4$; wherein $R_4$ is selected from the group consisting of alkyl and aryl radicals having from 1 to 10 carbon atoms; D, A, A' and A'' are alkylene radicals; $R_3$ is selected from the group consisting of NH, nitraza, oxygen and sulfur; $R_5$ is selected from the group consisting of oxygen, sulfur and NH; and $m$ is a small whole number of from 1 to 5.

12. The method of claim 11 wherein the moderator is selected from the group consisting of water, lower alkanols, and lower alkylene glycols.

13. The method of claim 11 wherein M is an alkali metal cation.

14. The method of preparing N-fluoro-N-nitro butylamine which comprises reacting fluorine with an alkali metal salt of N-nitro butylamine in the presence of a polar solvent moderator.

15. The method of claim 14 wherein the polar solvent moderator is water.

16. The method of preparing N,N'-difluoro-N,N'-dinitroethylendramine which comprises reacting fluorine with an alkali metal salt of N,N'-dinitroethylenediamine in the presence of a polar solvent moderator.

17. The method of claim 16 wherein the polar solvent moderator is water.

No references cited.

ALTON D. ROLLINS, *Primary Examiner.*

U.S. Cl. X.R.

149—36, 92, 299; 260—241, 268, 288, 296, 313.1, 329, 330.5, 347.7, 429, 429.1, 429.3, 429.7, 429.9, 430, 431, 435, 438.1, 438.5, 439, 446, 447, 448, 455, 482, 503, 534, 564, 552, 553, 568, 570.8, 570.9, 574, 578, 583, 584 583, 584.